US008752154B2

(12) United States Patent
Kelley

(10) Patent No.: US 8,752,154 B2
(45) Date of Patent: Jun. 10, 2014

(54) SYSTEM AND METHOD FOR AUTHENTICATING A USER

(75) Inventor: William E. Kelley, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 58 days.

(21) Appl. No.: 13/207,508

(22) Filed: Aug. 11, 2011

(65) Prior Publication Data

US 2013/0042314 A1    Feb. 14, 2013

(51) Int. Cl.
H04L 29/06    (2006.01)
(52) U.S. Cl.
USPC ................ 726/9; 726/4; 726/5; 726/7; 726/8; 713/155
(58) Field of Classification Search
USPC .......................................................... 726/9
See application file for complete search history.

(56) References Cited

U.S. PATENT DOCUMENTS

| | | | |
|---|---|---|---|
| 5,491,752 A * | 2/1996 | Kaufman et al. ............... 380/30 |
| 6,233,577 B1 * | 5/2001 | Ramasubramani et al. .......... 1/1 |
| 6,823,454 B1 * | 11/2004 | Hind et al. ..................... 713/168 |
| 8,028,331 B2 * | 9/2011 | Hermann et al. ................. 726/7 |
| 2004/0005051 A1 * | 1/2004 | Wheeler et al. ................. 380/28 |
| 2006/0235796 A1 * | 10/2006 | Johnson et al. ................. 705/44 |
| 2008/0008140 A1 * | 1/2008 | Forssell ......................... 370/338 |
| 2009/0300744 A1 * | 12/2009 | Guo et al. ......................... 726/7 |
| 2011/0131638 A1 * | 6/2011 | Kan ................................. 726/6 |
| 2011/0239281 A1 * | 9/2011 | Sovio et al. ....................... 726/5 |
| 2011/0258453 A1 * | 10/2011 | Mansfield ..................... 713/173 |
| 2012/0096525 A1 * | 4/2012 | Bolgert et al. .................... 726/6 |

OTHER PUBLICATIONS

Om Malik; "With a New App, Bump Gets a Bump," Tech News and Analysis; http://gigaom.com/2010/08/06/bump/; 10 pages, printed Jan. 23, 2012, Aug. 6, 2010.
Bump Technologies, Inc., The Bump App for iPhone and Android; Frequently Asked Questions; http://bu.mp/faq; 5 pages, printed Jan. 23, 2012.
Jefferson Graham, "*Bump app becomes a surprise hit*," USA Today; 3 pages; http://www.usatoday.com/tech/products/2011-04-19-bump-app.htm; printed Jan. 23, 2012.

* cited by examiner

*Primary Examiner* — Mohammad L Rahman
(74) *Attorney, Agent, or Firm* — Michael A. Springs

(57) ABSTRACT

According to one embodiment, a system including a memory and a processor is provided. The memory may be operable to store a plurality of accounts. Each account may be associated with a user and with a mobile device. The processor may be coupled to the memory and operable to receive user credentials, sent by a requesting user and originating from a requesting device, in conjunction with a request for authentication. The user credentials may include an account identifier. The processor may be further operable to retrieve, from the plurality of accounts, the account associated with the account identifier that matches the account identifier included in the user credentials. The processor may compare information included within the user credentials with information associated the account. If the information included within the user credentials matches the information associated with the account, the processor may send an authentication-confirmation message to a second device.

21 Claims, 4 Drawing Sheets

SYSTEM AND METHOD FOR
AUTHENTICATING A USER

TECHNICAL FIELD

This disclosure relates generally to authentication, and more particularly to a system for authenticating a user using a mobile device associated with the user.

BACKGROUND

As the demand for digital transactions has grown, so has the demand for better security and authentication of data. A user may use a mobile device to request a digital transaction to transfer finances or to make a purchase with another device or person. Before performing the transaction, the other device or person may desire to confirm the identity of the user. For example, a merchant may not wish to sell on credit to the user if the user cannot authenticate or confirm his identity through a password or key. However, passwords, keys, and the algorithms used to generate them may be stolen by hackers and pirates, thus compromising an authentication scheme that relies solely upon passwords and keys. In order to protect sensitive data and to stay ahead of hackers and pirates, institutions should consider more advanced security and authentication methods.

SUMMARY

According to one embodiment, a system including a memory and a processor is provided. The memory may be operable to store a plurality of accounts. Each account may be associated with a user and with a mobile device of the user. Each account may further be associated with an account identifier, an authentication token issued to the mobile device, a mobile device identifier associated with the mobile device, and a user identifier associated with the user. The processor may be coupled to the memory and operable to receive user credentials, sent by a requesting user and originating from a requesting device, in conjunction with a request for authentication. The user credentials may include a second account identifier, a second authentication token associated with the requesting mobile device, a second mobile device identifier associated with the requesting mobile device, and a second user identifier associated with the requesting user. The processor may be further operable to retrieve, from the plurality of accounts, the account associated with the account identifier that matches the second account identifier. The processor may be further operable to compare the second authentication token with the authentication token associated with the retrieved account, to compare the second mobile device identifier with the mobile device identifier associated with the retrieved account, and to compare the second user identifier with the user identifier associated with the retrieved account. The processor may be further operable to send an authentication-confirmation message to a second device if the second authentication token matches the authentication token associated with the retrieved account, if the second mobile device identifier matches the mobile device identifier associated with the retrieved account, and if the second user identifier matches the user identifier associated with the retrieved account.

Technical advantages of certain embodiments of the present disclosure include providing better authentication and security measures. Specifically, a second device may receive, from a user or a mobile device associated with the user, a request to perform a transaction. The second device or an owner of the second device may not wish to perform the transaction unless the user confirms his identity. To confirm the user's identity, the user may send user credentials to a server. The user credentials may include various identifiers and tokens used to identify the user and the user's mobile device. The server may compare these identifiers and tokens with identifiers and tokens associated with an account specified by the user. If these identifiers and tokens match those associated with the account, the server may confirm the user's identity with the second device or with the owner of the second device. Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

Figure 1:
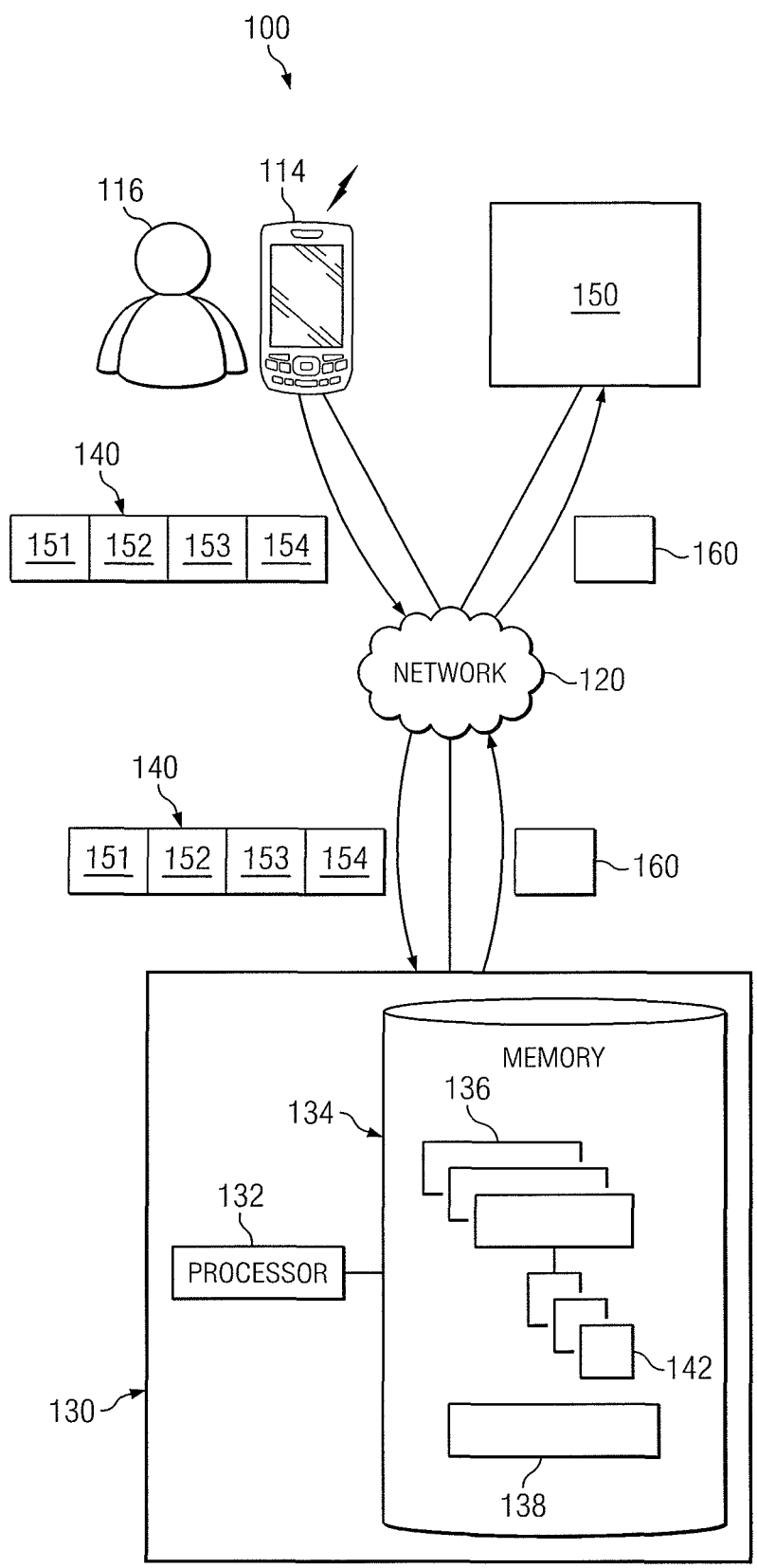
FIG. 1 is a schematic diagram of one embodiment of a system for authenticating a user.

FIG. 1 is a schematic diagram of one embodiment of a system for authenticating a user. As provided in FIG. 1, system 100 may include a mobile device 114, a network 120, a server 130, and a second device 150. A user 116 may use mobile device 114 to perform a financial transaction with second device 150. To do so, user 116 may use mobile device 114 to request a transaction with second device 150. However, second device 150 or an owner of second device 150 may not wish to perform the requested transaction without confirming the identity of user 116. For example, an owner of second device 150 may not wish to sell on credit to user 116 for fear that someone may have stolen mobile device 114 from user 116 and is now posing as user 116. In such instances, user 116 may confirm his identity to second device 150 by using server 130. User 116 may use mobile device 114 to send user credentials 140 to server 130. User credentials 140 may include identifying information associated with both user 116 and mobile device 114. Server 130 may compare user credentials 140 with account credentials 142 associated with user's 116 account 136. If the identifying information within user credentials 140 matches the information within account credentials 142, server 130 may send an authentication-confirmation message 160 to second device 150. Upon receiving authentication-confirmation message 160, second device 150 may consider the identity of user 116 confirmed. Second device 150 may then perform the requested transaction.

In particular embodiments, user 116 may use mobile device 114 to request the transaction with second device 150 and to confirm user's 116 identity to second device 150. As an example and not by way of limitation, mobile device 114 may be a laptop, a wireless or cellular telephone, an electronic notebook, a personal digital assistant, or any other wireless device capable of receiving, processing, storing, and/or communicating information with other components of system 100. Mobile device 114 may also include a user interface, such as a display, a microphone, keypad, or other appropriate terminal equipment usable by user 116. In particular embodiments, mobile device 114 may be configured to capture images. In some embodiments, an application executed by mobile device 114 may perform the functions described herein. Although this disclosure describes mobile device 114 with respect to particular types of devices, this disclosure contemplates mobile device 114 being any suitable device.

In particular embodiments, mobile device 114 may be configured to send user credentials 140 to server 130 or to second device 150. User credentials 140 may include an account identifier 151, an authentication token 152 issued to mobile device 114, a mobile device identifier 153 associated with mobile device 114, and a user identifier 154 associated with user 116. Account identifier 151 may be used by server 130 to retrieve a particular account 136. As an example and not by way of limitation, account identifier 151 may include an account name or an account ID. Authentication token 152 may be stored on mobile device 114. As an example and not by way of limitation, authentication token 152 may be a digital certificate. In particular embodiments, authentication token 152 may be issued to mobile device 114 by server 130 during a registration process. Mobile device identifier 153 may include the International Mobile Equipment Identity (IMEI) number associated with mobile device 114. User identifier associated 154 may include a password or key associated with user's 116 account 136. In particular embodiments, user identifier 154 may further include an image of user's 116 face, the credit card information of user 116, or other personal information associated with user 116. Server 130 may retrieve an account 136 with an account identifier 151 that matches the account identifier 151 included within user credentials 140. Account 136 may be associated with account credentials 142. Server 130 may then compare user credentials 140 with account credentials 142 to confirm the identity of user 116.

Figure 2:
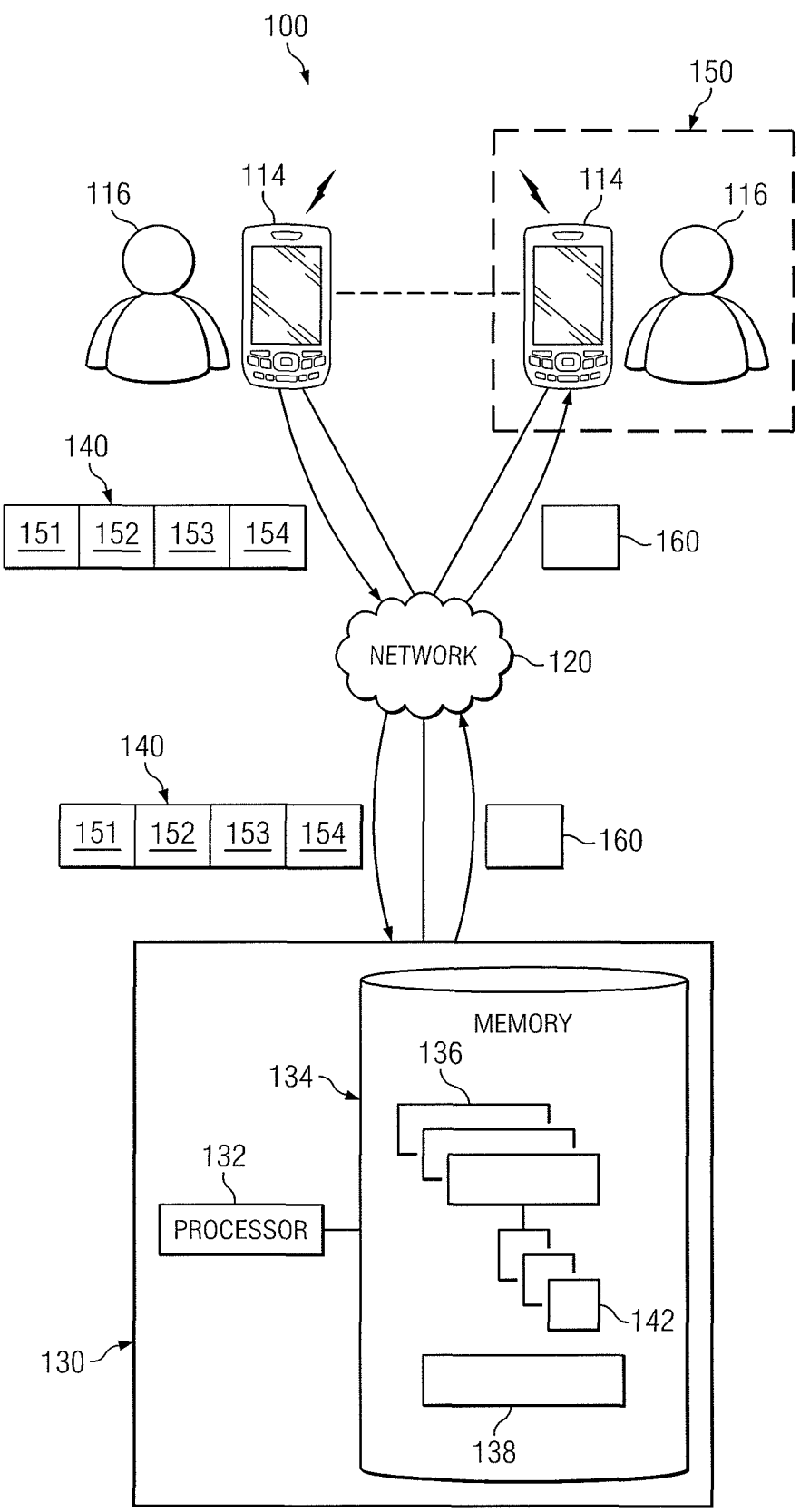
FIG. 2 is an illustration of a user confirming the user's identity with a second user using the system of FIG. 1.
Figure 3:
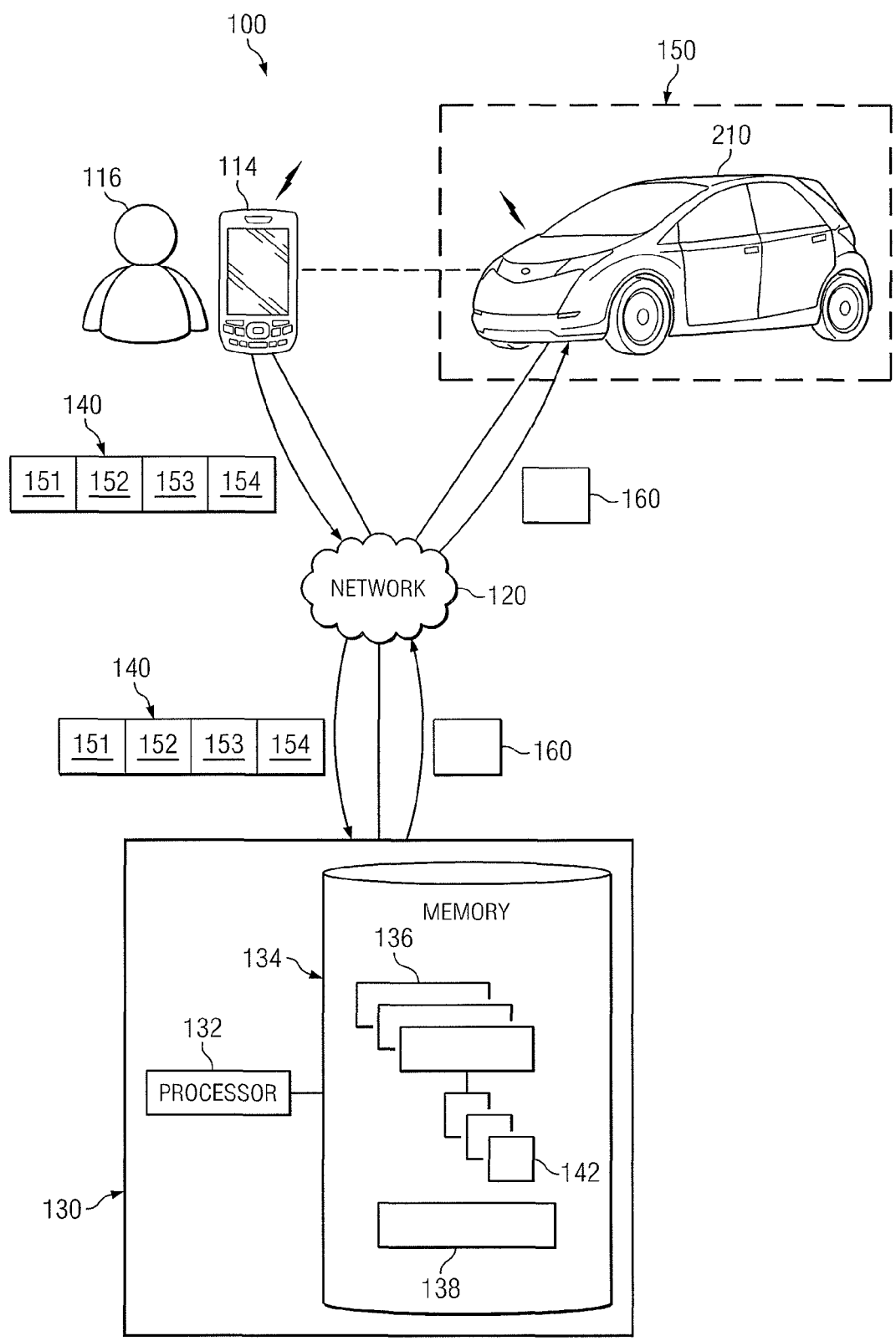
FIG. 3 is an illustration of a user confirming the user's identity with a vehicle using the system of FIG. 1.
Figure 4:
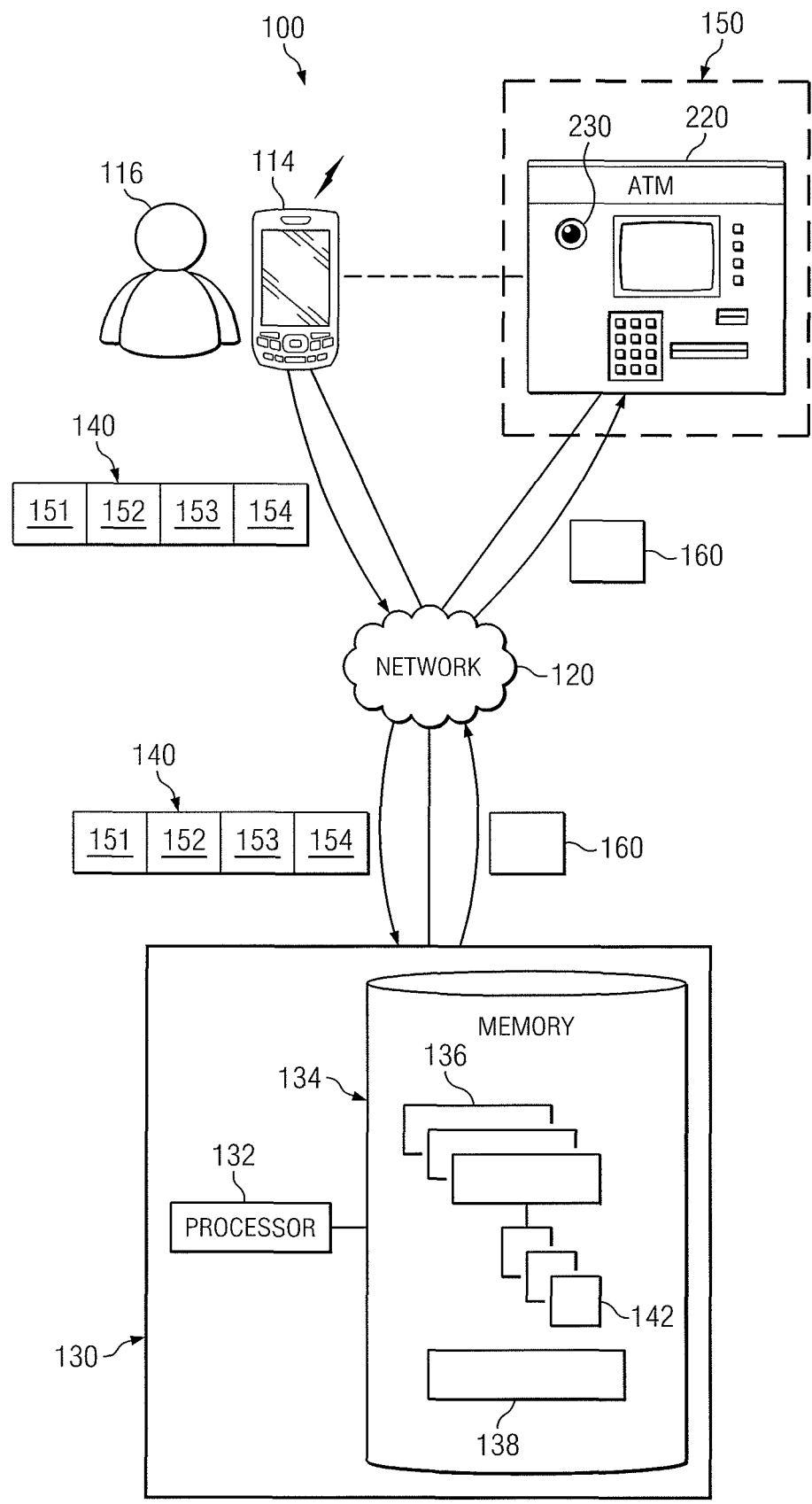
FIG. 4 is an illustration of a user confirming the user's identity with an Automatic Teller Machine using the system of FIG. 1.

System 100 further includes second device 150. Second device 150 may be operable to perform a transaction requested by a requesting user 116 through a requesting mobile device 114. Second device 150 or an owner of second device 150 may not wish to perform the requested transaction without first confirming the identity of the requesting user 116. After server 130 has confirmed the identity of requesting user 116, second device 150 may perform the requested transaction. In particular embodiments, second device 150 may send a request for authentication to server 130. In some embodiments, second device 150 may be further configured to receive user credentials 140 and to forward user credentials 140 to server 130 in conjunction with the request for authentication. Second device 150 may be configured to receive an authentication-confirmation message 160 from server 130 after server 130 confirms the identity of requesting user 116. Second device 150 may perform the requested transaction after receiving the authentication-confirmation message 160. Second device 150 may be any device suitable for performing a requested user transaction. As an example and not by way of limitation, second device 150 may be a second mobile device 114, a vehicle, an Automatic Teller Machine, or any other suitable device with which a transaction is sought to be performed. FIGS. 2 through 4 illustrate examples of system 100 including particular second devices 150.

System 100 may include a network 120. Network 120 may facilitate communication amongst mobile device 114, second device 150, and server 130. This disclosure contemplates any suitable network 120 operable to facilitate communication between the components of system 100, such as mobile device 114 and server 130. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

In particular embodiments, system 100 may include server 130. Server 130 may include a processor 132 and a memory 134. In particular embodiments, memory 134 may be operable to store a plurality of accounts 136, account credentials 142, and facial recognition software 138. Memory 134 may store, either permanently or temporarily, data, operational software, or other information for processor 132. Memory 134 may include any one or a combination of volatile or non-volatile local or remote devices suitable for storing information. For example, memory 134 may include random access memory (RAM), read only memory (ROM), magnetic storage devices, optical storage devices, or any other suitable information storage device or a combination of these devices. In particular embodiments, memory 134 may be configured to store information associated with the plurality of accounts 136. As an example and not by way of limitation, memory 134 may be configured to store account credentials 142 associated with each particular account 136. Account credentials 142 may include information that associates a particular account 136 with a particular user 116 and a particular mobile device 114. When server 130 receives user credentials 140 originating from a requesting user 116 using a requesting mobile device 114, server 130 may compare information within user credentials 140 with information within account credentials 142 to confirm the identity of requesting user 116. If the information matches, then server 130 may be confident that requesting user 116 is the particular user 116 and that the requesting mobile device 114 is the particular mobile device 114.

Processor 132 may be coupled to memory 134. Processor 132 may control the operation and administration of server 130 by processing information received from network 120 and memory 134. Processor 132 may include any hardware and/or software that operates to control and process information. For example, processor 132 may execute facial recognition software 138 to compare images of a requesting user's 116 face within user credentials 140 with images of a particular user's 116 face within account credentials 142. As another example, processor 132 may compare user credentials 140 with account credentials 142 to identify a requesting user 116. Processor 132 may be a programmable logic device, a microcontroller, a microprocessor, any suitable processing device, or any suitable combination of the preceding.

In particular embodiments, processor 132 may be operable to receive a request for authentication and user credentials 140 from a requesting user 116 using a requesting mobile device 114. Processor 132 may compare information within user credentials 140 with information associated with a particular account 136. If the information matches, processor 132 may send an authentication-confirmation message 160 to a second device 150 confirming the identity of requesting user 116. Second device 150 may then consider the identity of requesting user 116 confirmed and perform a transaction requested by requesting user 116. User credentials 140 may include an account identifier 151, an authentication token 152 issued to requesting mobile device 114, a mobile device identifier 153 associated with requesting mobile device 114, and a user identifier 154 associated with requesting user 116. Processor 132 may retrieve, from a plurality of accounts 136, the particular account 136 associated with an account identifier 151 that matches the account identifier 151 included within user credentials 140. The particular account 136 may be associated, through account credentials 142, with a particular user 116 and a particular mobile device 114. Processor 132 may be operable to compare information within user credentials 140 with information in account credentials 142. In particular embodiments, account credentials 142 may include an authentication token 152 issued, during a registration process, to a particular mobile device 114, a mobile device identifier 153 associated, during the registration process, with the particular mobile device 114, and a user identifier 154 associated, during the registration process, with the particular user 116. If processor 132 determines that the authentication token 152, mobile device identifier 153, and user identifier 154 within user credentials 140 match the authentication token 152, mobile device identifier 153, and user identifier 154 within account credentials 142, then processor 132 may send an authentication-confirmation message 160 to second device 150 confirming that requesting user 116 is the particular user 116 and that requesting mobile device 114 is the particular mobile device 114.

As an example and not by way of limitation, a requesting user 116 may use a requesting mobile device 114 to request a purchase transaction with a merchant's mobile device 150. The merchant may be unwilling to accept the purchase request without first confirming the requesting user's 116 identity. Requesting user 116 may use requesting mobile device 114 to send a request for authentication to server 130 along with user credentials 140. User credentials 140 may include an account identifier 151, a digital certificate issued to the requesting mobile device 114, a username, password or key associated with the requesting user 116, an image of requesting user's 116 face taken in real-time, and the IMEI number associated with requesting mobile device 114. Server 130 may retrieve, from a plurality of stored accounts 136, the particular account 136 identified by the account identifier 151 within user credentials 140. The particular account 136 may be associated with account credentials 142. Account credentials 142 may associate account 136 with a particular user 116 and a particular mobile device 114. For example, account credentials 142 may include a digital certificate issued to the particular mobile device 114, a username, password or key associated with the particular user 116, an image of the particular user's 116 face, and the IMEI number associated with the particular mobile device 114. If the digital certificates, usernames, passwords or keys, images, and IMEI numbers in user credentials 140 and account credentials 142 match, server 130 may send an authentication-confirmation message 160 to the merchant's mobile device 150. The merchant's mobile device may then perform the purchase transaction.

In operation, system 100 may perform a registration process and an authentication process. During the registration process, user 116 may set up account 136 to accommodate the authentication process. During the authentication process, user 116 may confirm his identity to second device 150.

Referring to the registration process, user 116 may register account 136 to accommodate the authentication process. User 116 may use mobile device 114 to send a request for registration to server 130. In some embodiments, user 116 may use another device to send the request for registration to server 130 and complete the registration process using mobile device 114. In response, server 130 may prompt user 116 to send identification information associated with user 116 and with mobile device 114. As an example and not by way of limitation, user 116 may send a username, or password or key to be associated with account 136. User 116 may further send other information such as an image of user's 116 face or information associated with a credit card associated with user 116. Although this disclosure describes user 116 sending particular types of information, this disclosure contemplates user 116 sending any suitable identifying information. In particular embodiments, user 116 may use mobile device 114 to send a mobile device identifier 153 associated with mobile device 114 in addition to sending the identifying information associated with user 116. As an example and not by way of limitation, mobile device 114 may send the IMEI number associated with mobile device 114 in addition to sending the identifying information associated with user 116.

Server 130 may receive the identifying information associated with user 116 and the unique identifier associated with mobile device 114. Server 130 may associate these identifiers with account 136. In addition, server 130 may generate an authentication token 152 associated with mobile device 114, and associate this authentication token 152 with account 136. As an example and not by way of limitation, the authentication token 152 may be a digital certificate generated by server 130. In particular embodiments, server 130 may issue the authentication token 152 to mobile device 114. Mobile device 114 may store the authentication token 152 for use during the authentication process. In particular embodiments, server 130 may store the authentication token 152 associated with mobile device 114, the identifying information associated with user 116 and the mobile device identifier 153 associated with mobile device 114 in account credentials 142. Server 130 may associate account credentials 142 with account 136. In this manner, account 136 may be set up to accommodate the authentication process. In particular embodiments, account credentials 142 may be changed by user 116 at any time outside of the registration process. As an example and not by way of limitation, user 116 may change the username or password within account credentials 142. As another example and not by way of limitation, user 116 may request, and server 130 may generate, a new authentication token 152. Server 130 may then issue the new authentication token 152 to mobile device 114.

Referring to the authentication process, a requesting user 116 may confirm the user's 116 identity to second device 150 using the authentication process so that second device 150 may perform a requested transaction. In particular embodiments, requesting user 116 may use requesting mobile device 114 to request a transaction with second device 150. Second device 150, or the owner of second device 150, may wish to confirm the identity of requesting user 116 before performing the requested transaction. In this scenario, requesting user 116 may use the authentication process to confirm his identity. If the requesting user 116 is not the user 116 that registered an account 136 during the registration process or if the requesting mobile device 114 is not the same mobile device used during the registration process, then server 130 may not confirm the identity of requesting user 116. To confirm the requesting user's 116 identity, requesting user 116 may use requesting mobile device 114 to send user credentials 140 to server 130. User credentials 140 may include an account identifier 151. In particular embodiments, user credentials 140 may further include an authentication token 152, such as a digital certificate, issued to requesting mobile device 114, a mobile device identifier 153 associated with requesting mobile device 114, and a user identifier 154 associated with requesting user 116. As an example, and not by way of limitation, the mobile device identifier 153 may include the IMEI number associated with requesting mobile device 114. User identifier 154 may include an image of user's 116 face scanned in real-time; the image of user's 116 face may be scanned during each iteration of the authentication process, images used during previous iterations may not be used again. In particular embodiments, the image may be associated with a timestamp and server 130 may examine the timestamp to determine if the image was taken in real time. In particular embodiments, the user identifier 154 may further include credit card information associated with user 116, a username, a password or key supplied by user 116, or other personal information associated with user 116.

Server 130 may retrieve, from a plurality of stored accounts 136, the particular account 136 associated with an account identifier 151 that matches the account identifier 151 included within user credentials 140. The particular account 136 may be associated, through account credentials 142, to a particular user 116 and a particular mobile device 114. Account credentials 142 may include an authentication token 152 associated with the particular mobile device 114, a mobile device identifier 153 associated with the particular mobile device 114, and a user identifier associated with the particular user 116.

Server 130 may compare the authentication token 152, the mobile device identifier 153, and the user identifier included within user credentials 140 with the authentication token 152, the mobile device identifier 153, and the user identifier included within account credentials 142. If the stated portions of user credentials 140 match the stated portions of account credentials 142, then server 130 may send an authentication-confirmation message 160 to second device 150. Upon receiving the authentication-confirmation message 160, second device 150 may consider the identity of requesting user 116 confirmed, and second device 150 may perform the requested transaction. In particular embodiments, server 130 may further send portions of account credentials 142 to second device 150 in conjunction with the authentication-confirmation message 160. In this manner, the owner of second device 150 may independently confirm the identity of requesting user 116. As an example and not by way of limitation, server 130 may send the image of the particular user's 116 face to second device 150 in conjunction with the authentication confirmation message. The owner of second device 150 may then check if requesting user's 116 face matches the face of the particular user 116. By using the authentication process, second device 150 or an owner of second device 150 may be able to confirm the identity of user 116.

In particular embodiments, system 100 may provide better security and authentication during digital transactions. Because account 136 is associated with a particular user 116 and a particular mobile device 114, it may be difficult for pirates and hackers to spoof a user's 116 identity when conducting a transaction with second device 150. As an example and not by way of limitation, even if a pirate or hacker stole the particular user's 116 personal information, they will not be able to complete the authentication process without further being in possession of the particular mobile device 114. Because the authentication token 152 issued to the particular mobile device 114 and the mobile device identifier associated with the particular mobile device 114 are stored on the particular mobile device 114, the pirate or hacker cannot send these credentials to server 130 without possessing the particular mobile device 114. As another example and not by way of limitation, if a thief stole the particular mobile device 114 associated with account 136, the thief would not be able to complete the authentication process because even though the thief may possess the information associated with the particular mobile device 114, the thief would not possess the information associated with the particular user 116. As a result, the thief would not be able to send server 130 the user identifier 154 associated with the particular user 116, and therefore cannot complete the authentication process. For example, the thief would not be able to send an image of the particular user's 116 face taken in real-time during the authentication process.

FIGS. 2-4 illustrate example uses of system 100. For example, as depicted in FIG. 2, a customer may confirm the customer's identity with a merchant using system 100. As depicted in FIG. 3, an owner of a vehicle may confirm the owner's identity with the vehicle. Finally, as depicted in FIG. 4, a user may confirm the user's identity with an Automatic Teller Machine (ATM).

FIG. 2 is an illustration of a user 116 confirming the user's identity with a second user 116 using the system 100 of FIG. 1. As provided in FIG. 2, system 100 may include a first user 116 using a first mobile device 114 to request a transaction with a second user 116 using a second mobile device 114. As an example and not by way of limitation, second user 116 may be a merchant and first user 116 may be a customer requesting a purchase transaction with the merchant. The merchant, however, may not be able to confirm the identity of the customer when the transaction is requested. The merchant may be uncomfortable processing the transaction without first confirming the identity of the customer. The customer may confirm the customer's identity to the merchant by sending a request for authentication along with user credentials 140 to server 130. In response to the request for authentication, server 130 may confirm the identity of the customer using the authentication process discussed above with respect to FIG. 1. Server 130 may retrieve a particular account 136 specified by the customer, and may compare information included within user credentials 140 with information associated with the particular account 136 to confirm the identity of the customer. Specifically, server 130 may verify that information associated with the customer and with first mobile device 114 matches information associated with the particular account 136. If the information matches, server 130 may be confident that the customer and first mobile device 114 are the user and the mobile device associated with the particular account 136. After server 130 confirms the customer's identity, server 130 may send an authentication-confirmation message 160 to the merchant. After the merchant receives the authentication-confirmation message 160, the merchant may perform the requested transaction.

FIG. 3 is an illustration of a user 116 confirming the user's 116 identity with a vehicle 210 using the system 100 of FIG. 1. As provided in FIG. 3, user 116 may use mobile device 114 to request a transaction with vehicle 210. As an example and not by way of limitation, user 116 may request vehicle 210 to unlock or to start up. However, before vehicle 210 unlocks or starts up, it may request user 116 to confirm user's 116 identity with server 130. As an example and not by way of limitation, before vehicle 210 unlocks or starts up, vehicle 210 may confirm that user 116 is the owner of vehicle 210 and that mobile device 114 is the mobile device 114 associated with the owner of vehicle 210. User 116 may confirm user's 116 identity with vehicle 210 by sending a request for authentication along with user credentials 140 to server 130. In response, server 130 may confirm user 116 as the owner of vehicle 210 and mobile device 114 as the mobile device 114 associated with the owner of vehicle 210 via the authentication process discussed above with respect to FIG. 1. After server 130 confirms user 116 as the owner of vehicle 210 and mobile device 114 as the mobile device 114 associated with the owner of vehicle 210, server 130 may send an authentication-confirmation message 160 to vehicle 210. Upon receiving authentication-confirmation message 160, vehicle 210 may perform the requested transaction to unlock or start up.

FIG. 4 is an illustration of a user 116 confirming the user's 116 with an ATM 220 using the system 100 of FIG. 1. As provided in FIG. 4, user 116 may use a mobile device 114 associated with user 116 to request a transaction with ATM 220. As an example and not by way of limitation, user 116 may request to withdraw a sum of money from ATM 220. However, the bank that owns ATM 220 may request user 116 to confirm user's 116 identity before the bank approves the withdrawal of money. In this situation, user 116 may confirm the user's 116 identity to the bank by sending a request for authentication along with user credentials 140 to server 130. In response, server 130 may use user credentials 140 to confirm the identity of user 116 via the authentication process discussed above with respect to FIG. 1. For example, server 130 may retrieve a particular account 136 specified by user 116, and may confirm that user 116 is the same user 116 associated with the particular account 136 and that mobile device 114 is the same mobile device 114 associated with the particular account 136. After server 130 confirms user's 116 identity, server 130 may send an authentication-confirmation message 160 to ATM 220. Upon receiving authentication-confirmation message 160, ATM 220 may consider the identity of user 116 confirmed and process the withdrawal of money.

In particular embodiments, ATM 220 may include a camera 230. ATM 220 may use camera 230 to take a picture of user's 116 face for use during the authentication process. As an example and not by way of limitation, ATM 220 may request user 116 to step in front of camera 230. Camera 230 may then take a picture of user's 116 face and send the picture to server 130. Server 130 may then compare the image with a picture of the face of the user 116 associated with the particular account 136. In particular embodiments, server 130 may execute facial recognition software 138 to compare the pictures. If server 130 determines that the pictures are substantially similar to one another, server 130 may send authentication-confirmation message 160 to ATM 220. Upon receiving authentication confirmation message 160, ATM 220 may process the withdrawal of money.

Although the present disclosure includes several embodiments, changes, substitutions, variations, alterations, transformations, and modifications may be suggested to one skilled in the art, and it is intended that the present disclosure encompass such changes, substitutions, variations, alterations, transformations, and modifications as fall within the spirit and scope of the appended claims.

What is claimed is:

1. A system comprising:
    a memory operable to store a plurality of accounts, each account associated with a user and with a mobile device of the user, each account further associated with:
        an account identifier;
        an authentication token issued to the mobile device;
        a mobile device identifier associated with the mobile device and comprising the International Mobile Equipment Identity number associated with the mobile device, and
        a user identifier associated with the user; and
    a processor coupled to the memory and operable to:
        receive a request for authentication and user credentials over a network from a requesting mobile device, wherein the request for authentication was communicated in conjunction with the requesting mobile device requesting a transaction from a second device, the user credentials comprising:
            a second account identifier;
            a second authentication token associated with the requesting mobile device;
            a second mobile device identifier associated with the requesting mobile device; and
            a second user identifier associated with the requesting user;
        retrieve, from the plurality of accounts, the account associated with the account identifier that matches the second account identifier;
        compare the second authentication token with the authentication token associated with the retrieved account;
        compare the second mobile device identifier with the mobile device identifier associated with the retrieved account;
        compare the second user identifier with the user identifier associated with the retrieved account;
        send an authentication-confirmation message to the second device if the second authentication token matches the authentication token associated with the retrieved account, if the second mobile device identifier matches the mobile device identifier associated with the retrieved account, and if the second user identifier matches the user identifier associated with the retrieved account, wherein the second device is operable to process the transaction in response to receiving the authentication-confirmation message; and
        issue the authentication token to the mobile device in conjunction with a request from the user prior to receiving the request for authentication.

2. The system of claim 1, the second device operable to perform, upon receiving the authentication-confirmation message, an operation requested by the requesting user.

3. The system of claim 1, the authentication-confirmation message confirming that the requesting mobile device is the mobile device associated with the retrieved account and that the requesting user is the user associated with the retrieved account.

4. The system of claim 1, the user identifier comprising at least one of a picture of the user's face scanned in real-time, credit card information associated with the user, the user's personal information, and a password or key associated with the user.

5. The system of claim 1, the authentication token comprising a digital certificate.

6. The system of claim 1, the processor further operable to receive the user credentials and the request for authentication from the second device.

7. The system of claim 1, the second device comprising at least one of the user's vehicle, a second mobile device associated with a second user, and an Automatic Teller Machine.

8. A method comprising:
    storing, by a computer, a plurality of accounts, each account associated with a user and with a mobile device of the user, each account further associated with an account identifier, an authentication token issued to the mobile device, a mobile device identifier associated with the mobile device and comprising the International Mobile Equipment Identity number associated with the mobile device, and a user identifier associated with the user;

receiving, by the computer, a request for authentication and user credentials, over a network from a requesting mobile device, wherein the request for authentication was communicated in conjunction with the requesting mobile device requesting a transaction from a second device, the user credentials comprising:
- a second account identifier
- a second authentication token associated with the requesting mobile device;
- a second mobile device identifier associated with the requesting mobile device; and
- a second user identifier associated with the requesting user;

retrieving, by the computer, from the plurality of accounts, the account associated with the account identifier that matches the second account identifier;

comparing, by the computer, the second authentication token with the authentication token associated with the retrieved account;

comparing, by the computer, the second mobile device identifier with the mobile device identifier associated with the retrieved account;

comparing, by the computer, the second user identifier with the user identifier associated with the retrieved account;

sending, by the computer, an authentication-confirmation message to the second device if the second authentication token matches the authentication token associated with the retrieved account, if the second mobile device identifier matches the mobile device identifier associated with the retrieved account, and if the second user identifier matches the user identifier associated with the retrieved account, wherein the second device is operable to process the transaction in response to receiving the authentication-confirmation message; and issuing the authentication token to the mobile device in conjunction with a request from the user prior to receiving the request for authentication.

9. The method of claim 8, the second device operable to perform, upon receiving the authentication-confirmation message, an operation requested by the requesting user.

10. The method of claim 8, the authentication-confirmation message confirming that the requesting mobile device is the mobile device associated with the retrieved account and that the requesting user is the user associated with the retrieved account.

11. The method of claim 8, the user identifier comprising at least one of a picture of the user's face scanned in real-time, credit card information associated with the user, the user's personal information, and a password or key associated with the user.

12. The method of claim 8, the authentication token comprising a digital certificate.

13. The method of claim 8, further comprising receiving the user credentials and the request for authentication from the second device.

14. The method of claim 8, the second device comprising at least one of the user's vehicle, a second mobile device associated with a second user, and an Automatic Teller Machine.

15. A system comprising:
an application executed by a first processor of a requesting mobile device and operable to:
- send a request for authentication; and
- send user credentials in conjunction with the request for authentication; and a second processor operable to:
- store a plurality of accounts, each account associated with a user and with a mobile device of the user, each account further associated with an account identifier, an authentication token issued to the mobile device of the user, a mobile device identifier associated with the mobile device of the user and comprising the International Mobile Equipment Identity number associated with the mobile device, and a user identifier associated with the user;
- receive the request for authentication and the user credentials, over a network from the requesting mobile device, wherein the request for authentication was communicated in conjunction with the requesting mobile device requesting a transaction from a second device, the user credentials comprising:
  - a second account identifier;
  - a second authentication token associated with the requesting mobile device;
  - a second mobile device identifier associated with the requesting mobile device; and
  - a second user identifier associated with the requesting user;
- retrieve, from the plurality of accounts, the account associated with the account identifier that matches the second account identifier;
- compare the second authentication token with the authentication token associated with the retrieved account;
- compare the second mobile device identifier with the mobile device identifier associated with the retrieved account;
- compare the second user identifier with the user identifier associated with the retrieved account;
- send an authentication-confirmation message to the second device if the second authentication token matches the authentication token associated with the retrieved account, if the second mobile device identifier matches the mobile device identifier associated with the retrieved account, and if the second user identifier matches the user identifier associated with the retrieved account, wherein the second device is operable to process the transaction in response to receiving the authentication-confirmation message; and
- issue the authentication token to the mobile device in conjunction with a request from the user prior to receiving the request for authentication.

16. The system of claim 15, the second device operable to perform, upon receiving the authentication-confirmation message, an operation requested by the requesting user.

17. The system of claim 15, the authentication-confirmation message confirming that the requesting mobile device is the mobile device associated with the retrieved account and that the requesting user is the user associated with the retrieved account.

18. The system of claim 15, the user identifier comprising at least one of a picture of the user's face scanned in real-time, credit card information associated with the user, the user's personal information, and a password or key associated with the user.

19. The system of claim 15, the authentication token comprising a digital certificate.

20. The system of claim 15, the second processor further operable to receive the user credentials and the request for authentication from the second device.

21. The system of claim 15, the second device comprising at least one of the user's vehicle, a second mobile device associated with a second user, and an Automatic Teller Machine.

\* \* \* \* \*